C. C. RAYL.
DEVICE FOR SHARPENING LAWN MOWERS.
APPLICATION FILED SEPT. 25, 1909.
948,962.
Patented Feb. 8, 1910.
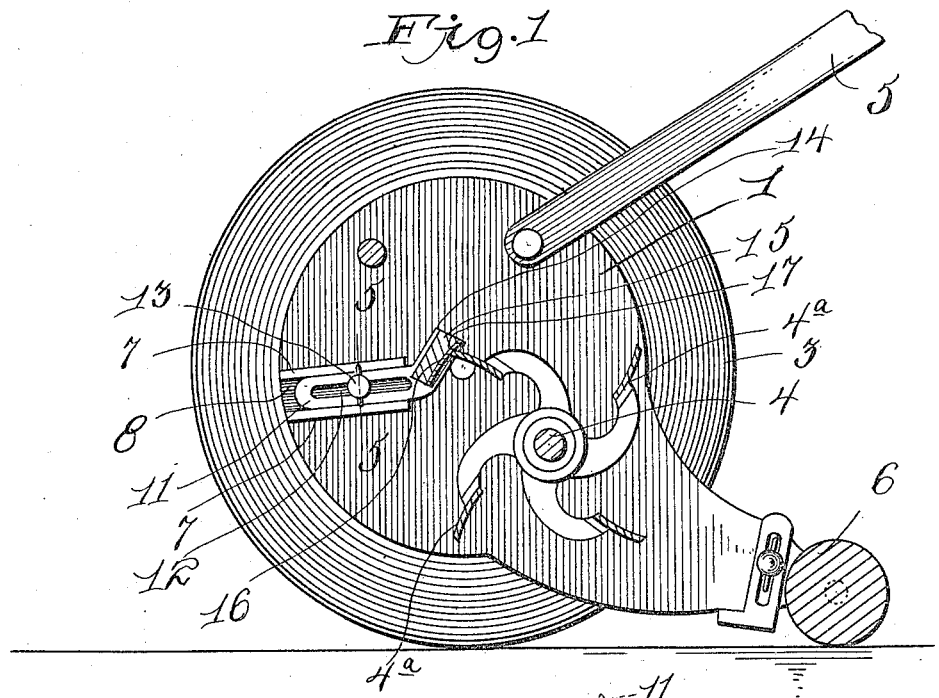
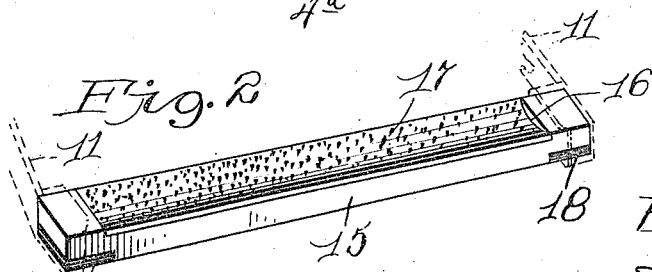
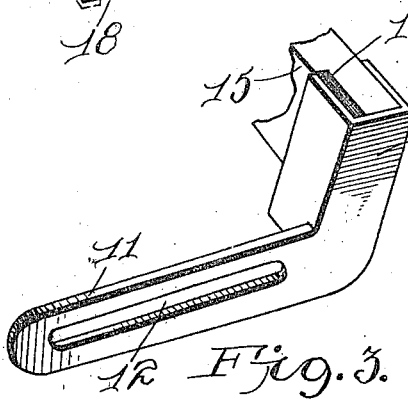
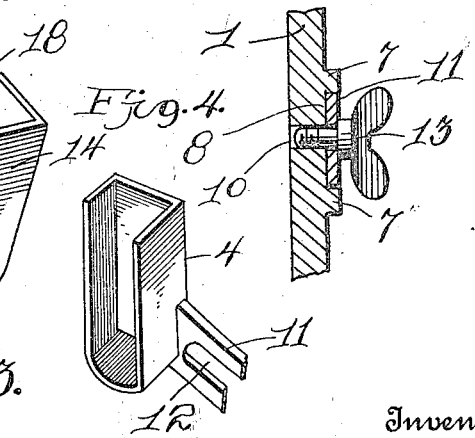
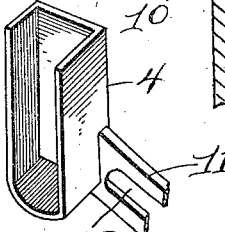
Witnesses
Inventor
Claude C. Rayl.
By E. E. Vrooman,
his Attorney.

UNITED STATES PATENT OFFICE.

CLAUDE C. RAYL, OF MONROE, INDIANA.

DEVICE FOR SHARPENING LAWN-MOWERS.

948,962.  Specification of Letters Patent.  Patented Feb. 8, 1910.

Application filed September 25, 1909. Serial No. 519,603.

*To all whom it may concern:*

Be it known that I, CLAUDE C. RAYL, a citizen of the United States of America, residing at Monroe, in the county of Adams and State of Indiana, have invented certain new and useful Improvements in Devices for Sharpening Lawn-Mowers, of which the following is a specification, reference being had therein to the accompanying drawing.

This invention relates to lawn mowers, and the principal object of the same is to provide a sharpening attachment therefor which may be adjusted relative to the cutting edges of the knives, and which may be kept on the machine if desired so that the mower will be self-sharpening, or may be detached therefrom.

In carrying out the objects of the invention generally stated above it is contemplated providing the frame of the mower with seats or guideways in which the supports for the sharpener are adapted to be adjustably mounted, said supports being provided with end seats in which the sharpener is yieldingly mounted so that the shock incidental to the contact of the cutting blades with the abrasive surface of the sharpener will be absorbed.

The invention also contemplates a novel structure of sharpener the abrasive surface of which conforms to the arc of the circle traversed by the cutting blades and the ends of which are adapted for a snug but yielding fit within the end seats of the supports, so that the sharpener may be removed without removing the supports from the mower.

It will be understood, of course, that in the practical application of the invention, the essential features of the same are necessarily susceptible of changes in details and structural arrangements, one preferred and practical embodiment of which is shown in the accompanying drawings, wherein—

Figure 1 is a central vertical sectional view of a lawn mower showing the same equipped with the improved sharpening device. Fig. 2 is a detail perspective view of the sharpener, its supports being indicated by dotted lines. Fig. 3 is a detail perspective view of one of the supports for the sharpener, one end of a sharpener being shown supported thereby. Fig. 4 is a fragmentary perspective view of one of the supports showing in detail the seat at one end thereof. Fig. 5 is a vertical view taken on the line 5—5, Fig. 1.

In the accompanying drawings but one end of a lawn mower has been shown, but it is to be understood that both ends are duplicates and hence it is thought that a detailed description of the end shown will suffice for a clear understanding of both ends.

Referring to said drawings by numerals, 1 designates the end frames of the mower in which the axle 2 for the wheels 3 is mounted and also in which the shaft 4 for the knives $4^a$. The usual handle 5 is connected to the frames, as is also the roller 6. At a point in advance of the knives $4^a$, each frame 1 is provided with horizontally arranged spaced apart parallel shoulders 7 which provide between them a guideway 8 having a transverse threaded opening 10 formed therein. The supports for the improved sharpening device are adapted to be adjustably seated in said guideway 8, each support comprising an arm 11 slidably seated in said guideway and provided with a central elongated slot 12 through which a set screw 13 mounted in the opening 10 projects and which is adapted to lock said arm in the desired adjusted position in said guideway. The inner end of each arm carries an upstanding inwardly projecting seat 14, having an open top and inner side and a closed bottom. Said seat is preferably arranged on an upward inclination relative to its arm so that the sharpener supported therein will be retained at the proper angle relative to the cutting edge of the knives.

The sharpener comprises a flat base board 15, one wide surface of which is concaved between its ends, as indicated at 16 and forms a seat for the abrasive material 17 which is similarly concaved. The opposite side of the base board 15 is flat and its ends are recessed for the reception of blocks of cushioning material 18, such as rubber.

As will be understood, the sharpener has its ends placed in the seats 14 with its abrasive surface presented to the cutting edges of the knives, so that when the sharpening device is properly adjusted, the said edges will contact therewith and be sharpened, the shock incidental to the contact of said knives with the abrasive surface being absorbed by the cushioning material which is interposed between one side of said seats 14 and the ends of the base board 15. The base board has a snug fit within its seats 14, but may be readily removed therefrom when necessary or desirable, and it will also be understood that the arms 11 which carry said seats may be removed from their guideway by releasing the set screws 13.

It will be seen from the foregoing that the improved sharpening device provides simple means whereby the abrasive material is held in proper position for treating the cutting edges of the knives, and the device may be retained on the mower to make the same a self-sharpener.

What I claim as my invention is:—

1. A sharpener for lawn mowers, comprising arms adapted for adjustable and detachable engagements with a lawn mower frame, an upwardly-inclined, integral end seat carried by each arm, and a sharpener having cushioned ends removably mounted in said seats.

2. A sharpening attachment for lawn mowers comprising supporting arms having end seats, a sharpener having recessed ends, and cushioning material in said recessed ends, said cushioned ends being mounted in said seats.

3. A sharpening attachment for lawn mowers, comprising supporting arms adapted for detachable and adjustable engagement with a mower frame, an upwardly-inclined, inwardly projecting seat carried by each arm, said seats having their top and inner side open, and a sharpener having its end supported by said seats.

In testimony whereof I hereunto affix my signature in presence of two witnesses.

CLAUDE C. RAYL.

Witnesses:
M. F. PARRISH,
W. H. OLIVER.